United States Patent
Gerbus

(10) Patent No.: US 9,383,517 B2
(45) Date of Patent: Jul. 5, 2016

(54) ALTERNATE COUPLING OF DEVICES VIA MULTIPLE BRANCHES OF A WAVEGUIDE

(71) Applicant: Intel Corporation, Santa Clara, CA (US)

(72) Inventor: Dan H. Gerbus, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 26 days.

(21) Appl. No.: 14/486,924

(22) Filed: Sep. 15, 2014

(65) Prior Publication Data

US 2016/0077285 A1 Mar. 17, 2016

(51) Int. Cl.
G02B 6/42 (2006.01)
G02B 6/35 (2006.01)
H01P 1/12 (2006.01)
G02B 6/26 (2006.01)

(52) U.S. Cl.
CPC ............... *G02B 6/35* (2013.01); *G02B 6/3598* (2013.01); *H01P 1/122* (2013.01); *G02B 6/3504* (2013.01); *G02B 6/3508* (2013.01)

(58) Field of Classification Search
CPC .... G02B 6/3502; G02B 6/3506; G02B 6/351; G02B 6/3568; G02B 6/3598; G02B 6/3504; G02B 6/264; G02B 6/35
USPC .......................................................... 385/25
See application file for complete search history.

(56) References Cited

U.S. PATENT DOCUMENTS

| | | | |
|---|---|---|---|
| 6,369,798 B1 | 4/2002 | Yatsu et al. | |
| 6,961,488 B2 * | 11/2005 | Lee ..................... | G02B 6/3508 385/140 |
| 7,168,860 B2 * | 1/2007 | Kim ..................... | G02B 6/3508 385/55 |
| 7,444,042 B1 * | 10/2008 | Niblock ............... | G02B 6/3502 385/16 |
| 7,570,847 B1 * | 8/2009 | Niblock ............... | G02B 6/3502 385/16 |
| 7,706,645 B2 * | 4/2010 | Zeiger ..................... | G02B 6/43 385/31 |
| 8,285,090 B2 * | 10/2012 | Vasko .................. | H04B 10/801 385/16 |
| 8,798,411 B1 | 8/2014 | Miller et al. | |
| 2004/0141683 A1 | 7/2004 | Hsu et al. | |
| 2004/0264848 A1 * | 12/2004 | Lee ..................... | G02B 6/3508 385/22 |
| 2005/0152651 A1 * | 7/2005 | Kim ..................... | G02B 6/3508 385/62 |
| 2006/0228068 A1 | 10/2006 | Ouchi et al. | |
| 2008/0159699 A1 * | 7/2008 | Zeiger ..................... | G02B 6/43 385/89 |
| 2010/0154325 A1 | 6/2010 | Boesel et al. | |

OTHER PUBLICATIONS

Keyssa, "Technology.", 9 pages, Dec. 18, 2014.
International Search Report and Written Opinion, mailed Nov. 19, 2015, issued in corresponding International Application No. PCT/US2015/044689, 16 pages.

* cited by examiner

Primary Examiner — Rhonda Peace
(74) Attorney, Agent, or Firm — Schwabe, Williamson & Wyatt, P.C.

(57) ABSTRACT

Embodiments of the present disclosure are directed toward techniques and configurations for alternate connection of two devices via multiple branches of a waveguide. In one embodiment, the apparatus may include a first device (e.g., a peripheral device), a second device (e.g., a computing device) mountable on the first device in a first or second position, and a waveguide substantially disposed in the first device to communicatively couple the first device with the second device. The waveguide may comprise a movable connector and first and second branches corresponding to the first and second positions. The movable connector may alternately communicatively couple the first device with the second device via the first or second branch and disconnect the second or first branch respectively in response to corresponding placement of the second device in the first or second position. Other embodiments may be described and/or claimed.

16 Claims, 8 Drawing Sheets

ALTERNATE COUPLING OF DEVICES VIA MULTIPLE BRANCHES OF A WAVEGUIDE

FIELD

Embodiments of the present disclosure generally relate to the field of electronic devices, and more particularly, to techniques and configurations for alternate connection of devices, such as computing devices with peripheral devices, via multiple branches of a waveguide.

BACKGROUND

Current computing devices may often be configured to be communicatively connectable to peripheral devices, such as desktop docking stations, keyboard bases, and the like. In many peripheral devices, multiple mounting positions may be desired and/or supported, in which the computing device may be placed. For each mounting position, an interconnect may be provided to enable communicative connection between the peripheral and computing devices. Typically, a waveguide may be needed to channel and contain the radio frequency (RF) or optical signals between a computing device and a peripheral device. The waveguide may include multiple branches or signal paths, corresponding to a number of mounting positions. Such multiple branches, even when inactive, may generate reflected signals that may induce noise. Accordingly, either fine tuning of the branches in the waveguide may be needed, or additional sets of communication components (e.g., transceivers) may need to be installed, which may increasing maintenance and operation costs of the computing device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
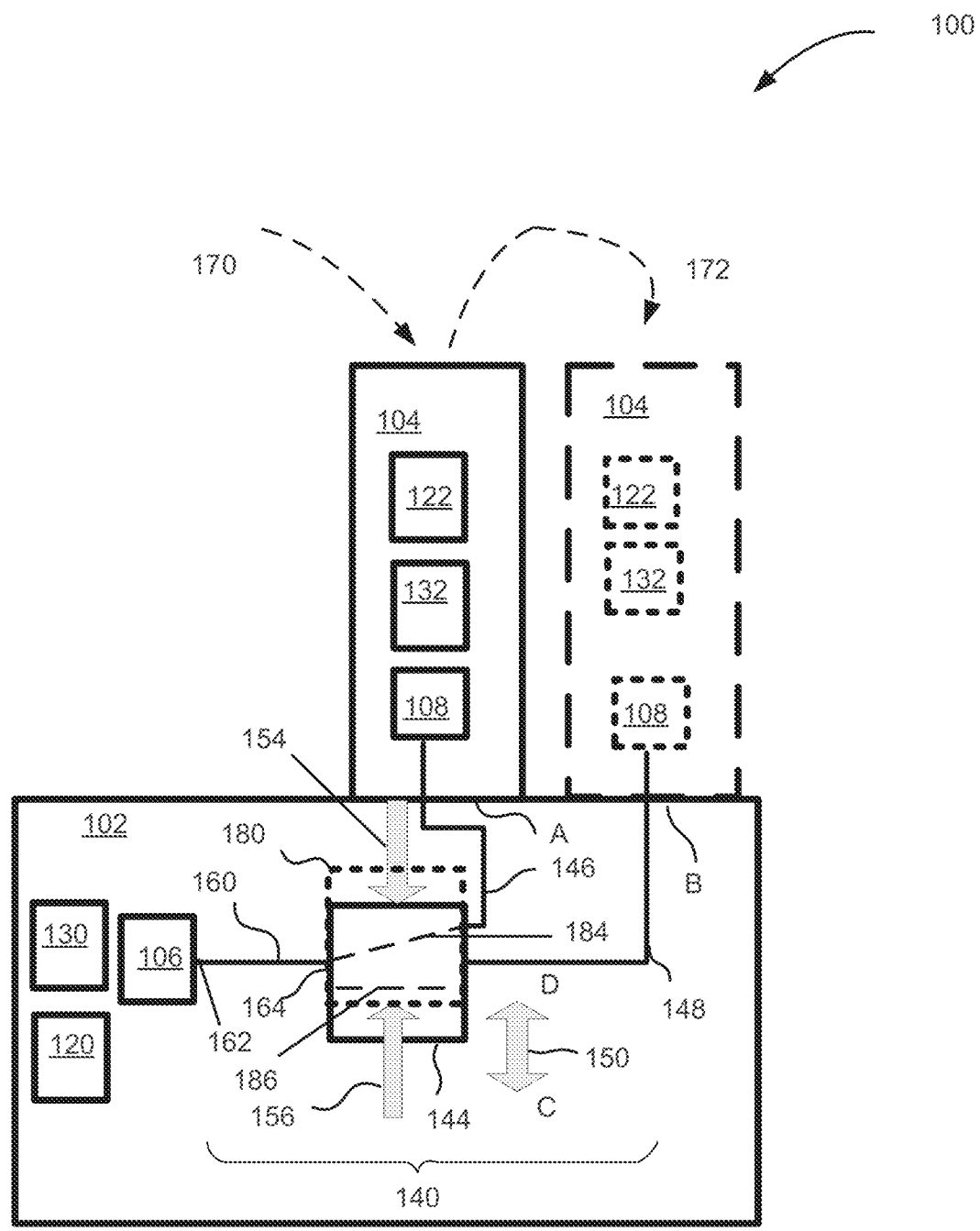
FIG. 1 is a block diagram of a system that may include a first device and a second device that is mountable on the first device in at least two mounting positions and that may be communicatively coupled with the first device in each mounting position, in accordance with some embodiments.

Embodiments of the present disclosure describe techniques and configurations for an apparatus for alternate connection of computing devices with peripheral devices via multiple branches of a waveguide. In some embodiments, the apparatus may include a first device (e.g., a peripheral device), a second device (e.g., a computing device) mountable on the first device in a first or second position, and a waveguide substantially disposed in the first device to communicatively couple the first device with the second device. The waveguide may comprise a movable connector and first and second branches corresponding to the first and second positions. The movable connector may alternately communicatively couple the first device with the second device via the first or second branch and disconnect the second or first branch respectively in response to corresponding placement of the second device in the first or second position.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a system 100 that may include a first device 102 and a second device 104 that is mountable on the first device 102 in at least two mounting positions and that may be communicatively coupled with the first device 102 in each mounting position, in accordance with some embodiments. In some embodiments, the first and second devices 102, 104 may comprise a computing device or a combination of computing device. For example, the first and second devices may comprise a computing device (e.g., device 104) and a peripheral device (e.g., device 102) that may be connectable with device 104.

As illustrated, first and second devices 102 and/or 104 may include processors 120 and 122 and memories 130 and 132 respectively, and other components configured to provide desired computing and other functionalities for the system 100. In some embodiments, the other components of devices 102 and 104 may comprise a first communication component 106 and a second communication component 108 disposed in the first and second devices 102 and 104 respectively. The first device 102 may be communicatively coupled with the second device 104 via the respective first and second communication components 106 and 108, for example, using near field or other communication protocol that may provide network connectivity for the devices 102 and 104 comprising the system 100. I In some embodiments, the processor 120 and/or memory 130 of the first device 102 may be configured to generate and/or process data to be provided to the second device 104 by the first communication component 106 via a communication interface, such as a waveguide 140. Conversely, the processor 120 and/or memory 130 of the first device 102 may be configured to generate and/or process data to be provided to the second device 104 by the second communication component 108 via the waveguide 140. In some embodiments, the first and second communication components 106, 108 may comprise transceivers to transmit and receive radio frequency signals between devices 102 and 104. An example configuration of the system 100 is described in more detail in reference to FIG. 10.

In some embodiments, the second device 104 may be configured to be mountable on the first device 102 in at least two positions, indicated by letters A and B in FIG. 1. The waveguide 140 may be substantially disposed in the first device 102 to communicatively couple the first device 102 with the second device 104, e.g., via the first and second communication components 106, 108. In some embodiments, at least some components of the waveguide 140 may be disposed in the second device 104. The waveguide 140 may comprise, or provide connectivity with, first and second branches 146, 148 that correspond to the first and second positions A and B respectively.

More specifically, the waveguide 140 may be configured to communicatively couple the first communication component 106 of the first device 102 with the second communication component 108 of the second device 104 via the first branch 146, when device 104 is mounted on device 102 in the first position A. Similarly, the waveguide 140 may be configured to communicatively couple the first communication component 106 of the first device 102 with the second communication component 108 of the second device 104 via the second branch 148, when device 104 is mounted on device 102 in the second position B. In embodiments, the waveguide 140 may comprise a bare dielectric, a dielectric clad in a signal-containing material, an air-filled tube, an optical fiber cable, or any other arrangement suitable for facilitating radio signal transmission. More generally, the waveguide 140 may comprise any physical medium configured to facilitate communications between the first and second communication components 106, 108 in a near field environment.

The waveguide 140 may further comprise a movable connector 144 coupled with the first and second branches 146, 148 to alternately communicatively couple the first device 102 with the second device 104 via the first branch 146 or second branch 148 and disconnect the second branch 148 or first branch 146 respectively, in response to corresponding placement of the second device 104 in the first position A or second position B. It will be appreciated that the second device 104 may be configured to be mountable on the first device 102 in multiple positions and the movable connector 144 may be configured to alternately communicatively couple the first device 102 with the second device 104 in each of the multiple positions, in response to placement of the second device in a corresponding position. For ease of understanding, placement of the second device 104 in two positions A or B and corresponding embodiments of the movable connector 144 enabling alternative coupling of the first and second devices 102, 104 in positions A or B will be described herein.

In embodiments, the movable connector 144 may be movable into a third position C (as indicated by arrow 150), to communicatively couple the first device 102 with the second device 104 via the first branch 146 and to disconnect the second branch 148. The movable connector 146 may be configured to move into the third position C, for example, in response to placement of the second device 104 in the first position A. For example, placement of the second device in the first position A (as indicated by arrow 170) may cause an external force (e.g., pressure) 154 to apply (directly or indirectly, via an intermediary (not shown)) to the movable connector 144, causing the movable connector 144 to move into the third position C.

Conversely, the movable connector 144 may be movable into a fourth position D (as indicated by arrow 150 and the representation 180 of the connector 144 with dotted line) to communicatively couple the first and second devices 102 and 104 via the second branch 148 and to disconnect the first branch 146, in response to placement of the second device 104 in the second position B (as indicated by arrow 172). For example, removal of the second device from the first position A may cause a return force 156 to apply (directly or indirectly) to the movable connector 144, causing the movable connector 144 to move (e.g., return) into the third position C. The return force 156 may be provided by a return component, e.g., a spring or electromagnetic actuator, as described below.

The waveguide 140 may further comprise an elongated portion 160 configured to connect the first communication component 106 at the elongated portion 160's first end 162 with the movable connector 144 disposed at the elongated portion 160's second end 164. In some embodiments, the movable connector 144 may comprise a valve that may include at least one connecting element 184 to alternately connect the second communication component with the first communication component via the first or second branch. In some embodiments, the connecting element 184 may be alignable with the elongated portion 160. In some embodiments, the connecting element 184 may also be alignable with a first or second branch corresponding to positions C or D of the movable connector 144, making first branch 146 or second branch 148 active (e.g., capable of signal transmission and delivery), and another corresponding branch (148 or 146 respectively) inactive. In some embodiments, discussed below in greater detail, the connecting element 184 may form the first branch 146 or second branch 148, depending on a position C or D of the movable connector.

For ease of understanding, the illustrative example of the movable connector 144 is shown to include two connecting elements 184, 186. The first connecting element 184 may be alignable with the first branch 146 in position C, while second connecting element 186 may be disconnected from the second branch 148, thus disconnecting the second branch 148, as shown. Conversely, connecting element 186 may be alignable with the second branch 148 in position D, while connecting element 184 may be disconnected from the first branch 146, thus disconnecting the first branch 146. Some embodiments of the system (e.g., 100) using a movable connector similar to one described above are discussed below in reference to FIGS. 2-8.

Figure 2:
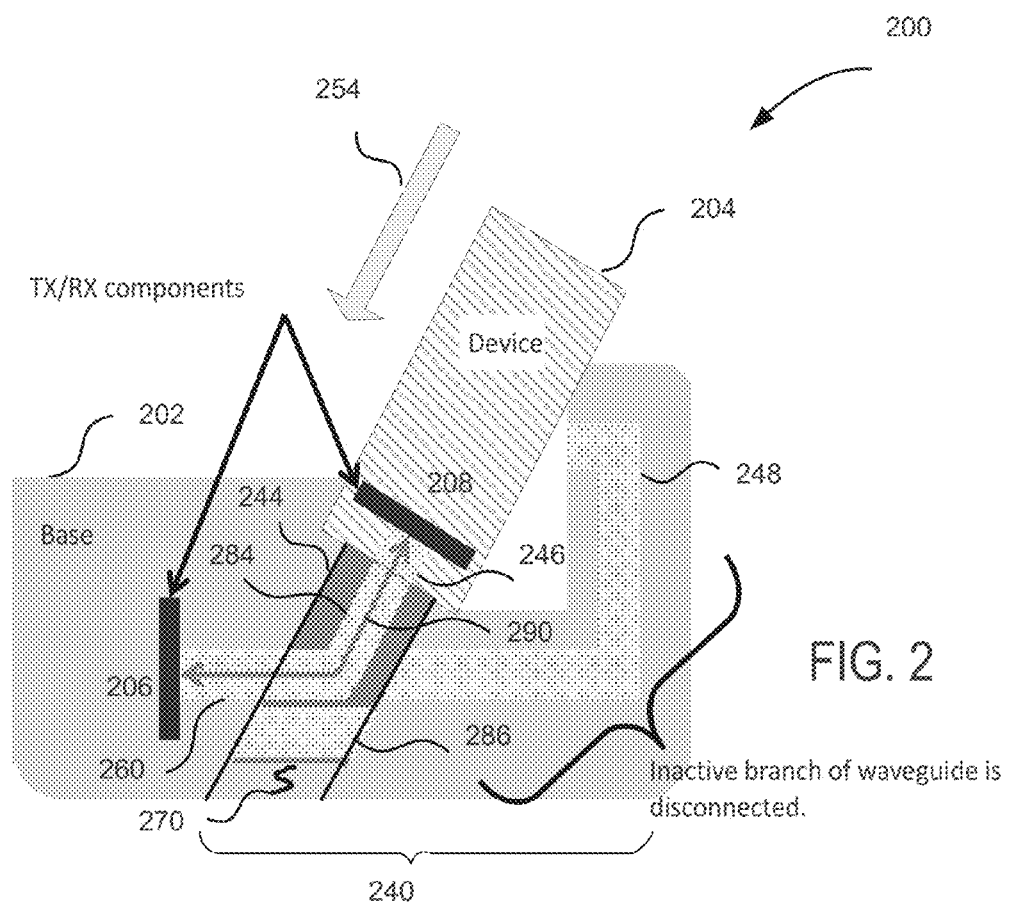
FIGS. 2-3 illustrate an example implementation of a system described in reference to FIG. 1, in accordance with some embodiments.
Figure 3:
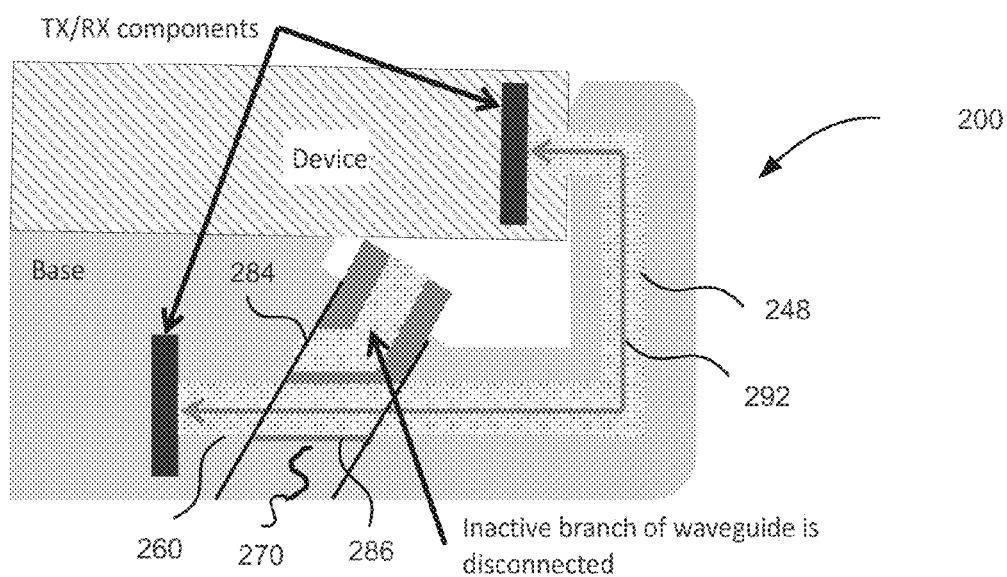

FIGS. 2-3 illustrate an example implementation of a system described in reference to FIG. 1, in accordance with some embodiments. The system 200 (similar to 100 of FIG. 1) may include a first device and a second device mountable on a first device in two positions. More specifically, the first device may comprise a base (e.g., keyboard base) 202 and the second device may comprise a computing device (e.g., a tablet computer) 204 mountable on the base 202.

FIG. 2 illustrates an example implementation of the system 200 similar to system 100 described in reference to FIG. 1, wherein the device 204 is mounted on the base 202 in a first mountable position, which may comprise an open clamshell orientation of the system 200. The base 202 may be communicatively coupled with the device 204 similar to the example described in reference to FIG. 1. For example, a first communication component 206 (e.g., transceiver Tx/Rx) may be connected with a second communication component 208 (e.g., transceiver Tx/Rx) via a waveguide 240 having a movable connector 244.

As shown, in the open clamshell orientation, the movable connector 244 may include a first connecting element 284 that may be alignable with elongated portion 260, forming a first branch 246 of the waveguide 240 and providing communicative connection 290 between the communication components 206 and 208. The alignment of the first connecting element 284 with the elongated portion 260 may occur in response of external force (e.g., pressure) applied by the device 204 on the movable connector 244, causing the movable connector 244 to move substantially down relative to the base 202, as indicated by arrow 254. As a result of the movement, the movable connector 244 may depress a return element (e.g., spring) 270. As a result of the movement of the movable connector 244, a second connecting element 286 may be disconnected from the second (inactive) branch 248, thus disconnecting the second branch 248, as shown.

FIG. 3 illustrates the system 200, wherein the device 204 is placed on the base 202 in a second mountable position. The second mountable position of the device 204 on the base 202 may comprise a closed mode orientation of the system 200. As shown, in the closed mode orientation, in the absence of application of external force to the movable connector 244, the movable connector 244 may return to its original (non-depressed) position by the spring 270. In this position, the connecting element 286 may be alignable with the second branch 248, providing communicative connection 292 between the communication components 206 and 208. Connecting element 284 may be disconnected from the elongated portion 260, effectively disconnecting the first branch 246 formed as described in reference to FIG. 2.

Figure 4:
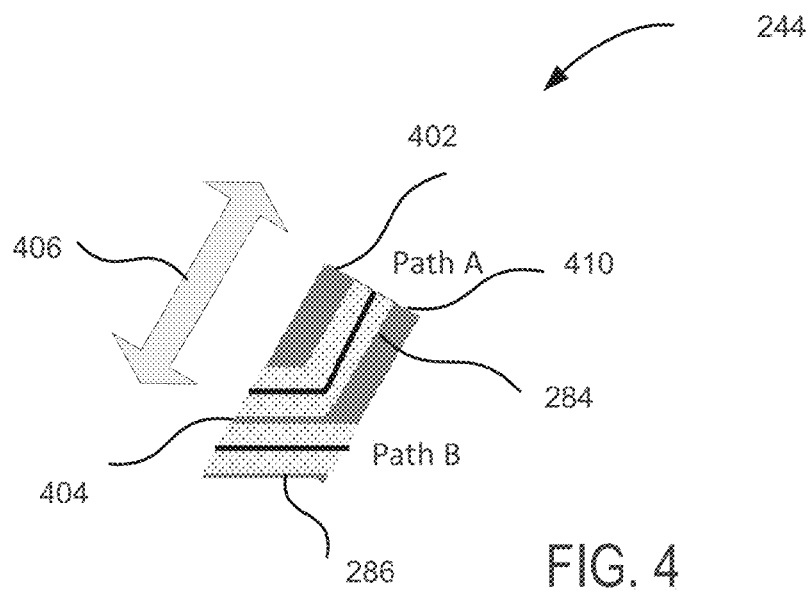
FIG. 4 illustrates an example cross-sectional view of the movable connector as described in reference to FIGS. 2-3, in accordance with some embodiments.

FIG. 4 illustrates an example cross-sectional view of the movable connector 244 as described in reference to FIGS. 2-3, in accordance with some embodiments. As described in reference to FIGS. 2-3, the movable connector (valve) 244 may move in a substantially vertical direction or under an angle relative to the base 202 plane, as illustrated by arrow 406. As shown, the movable connector 244 may comprise a valve and include the first and second connecting elements 284 and 286 providing paths "A" and "B" for the signal, depending on a position of the movable connector 244 relative to the base 202, as described in reference to FIGS. 2-3. The first and second connecting elements 284 and 286 may be placed inside a body 402 of the movable connector (valve) 244 at a distance 404, to alleviate or eliminate potential noise effects.

The body 402 of the movable connector (valve) 244 may comprise a number of different shapes, for example, it may be substantially oblong, having substantially tubular or rectangular shape if seen from the top 410. The first and second connecting elements 284 and 286 inside the body 402 may comprise waveguide components compatible with the waveguide 240 (shown in FIG. 2). For example, the connecting elements 284 and 286 may comprise wave-transmittable or electric signal-transmittable material (e.g., dielectric, air filled cavity, plastic, or the like) plated in a signal-containing material. Body 402 may comprise the signal-containing material (e.g. magnesium, aluminum, or metal clad plastic) such that the elements 284 and 286 may be un-plated. In some embodiments, body 402 may contain multiple connecting elements 284 and 286 to establish parallel paths that may actuate as a single unit.

Figure 5:
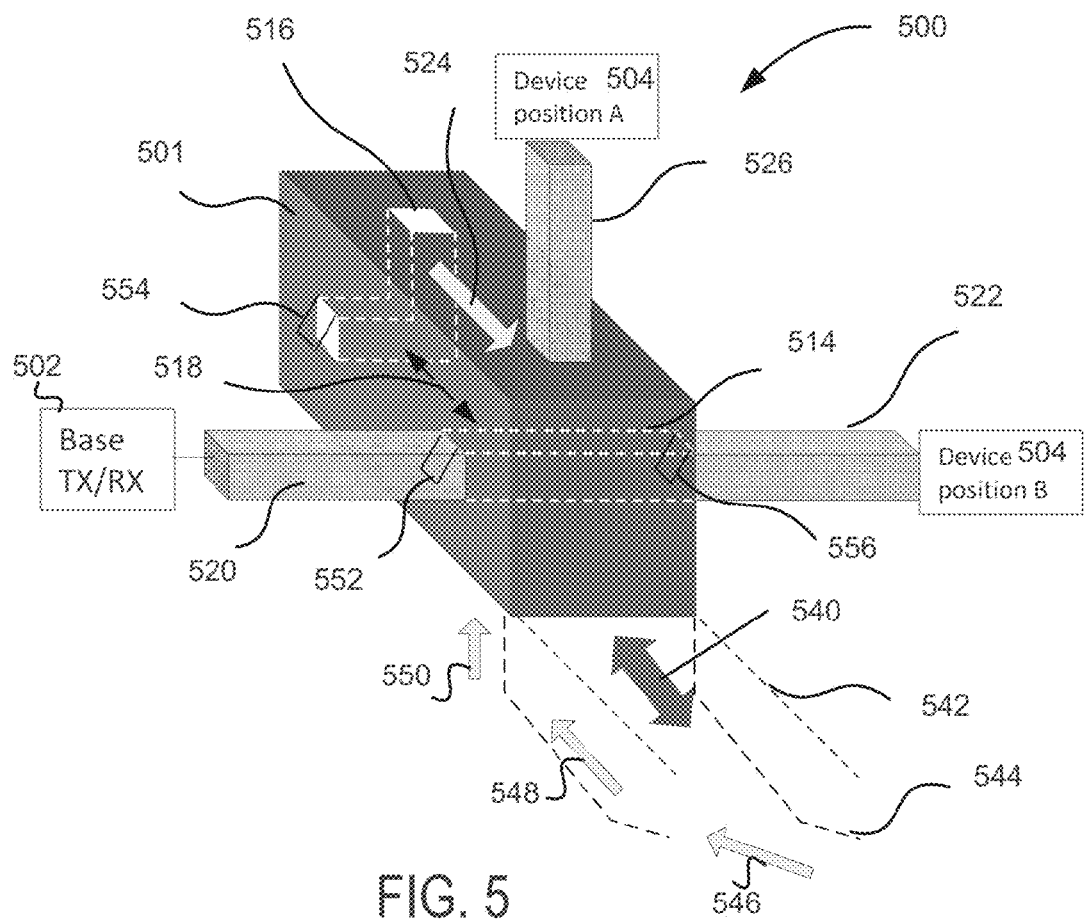
FIG. 5 illustrates an example three-dimensional view of a movable connector that may be used in a waveguide similar to ones described in reference to FIGS. 1-3, in accordance with some embodiments.

FIG. 5 illustrates an example three-dimensional view of a movable connector that may be used in a waveguide similar to ones described in reference to FIGS. 1-4, in accordance with some embodiments. The movable connector 500 may include first and second connecting elements 514 and 516. The connecting elements 514 and 516 may be placed inside a body 501 of the movable connector 500 at a distance 518, to alleviate or eliminate potential noise effects and to enable lateral movement of the movable connector 500 indicated by arrow 540.

A mountable device (e.g., second device 104 or 204 of FIG. 1 or 2), which is schematically illustrated by 504, may be mounted on a first device (e.g., first device 102 or 202 of FIG. 1 or 2), which is schematically illustrated by numeral 502 in positions A or B. As shown, in position B of device 504, the waveguide connecting the two devices 502, 504 may comprise an elongated portion 520, the first connecting element 514 of the movable connector 500, and a first branch 522, and may provide communicative connection between devices 502, 504. If device 504 is placed in position A, the movable connector may move laterally, as indicated by arrow 524, to ensure alignment of the second connecting element 516 with the elongated portion 520 and a second branch 526, to provide communicative connection between devices 502, 504.

The lateral movement of the movable connector 500 may be ensured by an application of an external force to the movable connector 500, which may be triggered by a variety of factors, similar to ones described in reference to FIGS. 1-3. For example, lateral movement of the movable connector 500 may be caused by removal of device 504 from position B or placement of device 504 into position A. The external force may result from applying mechanical or electromagnetic moment to the movable connector 500. For example, a sensor (not shown) may sense removal of device 504 from position B or placement of device 504 into position A and trigger an electromagnetic actuator (not shown) to move the movable connector 500, e.g., in the direction indicated by arrow 524.

Alignment of the first and second connecting elements 514, 516 with elongated portion 520 and respective branches 522, 526 may be provided in a number of different ways. For example, physical stops in device 502 (e.g., base) may provide a means for mechanical alignment, and the actuating mechanism may be sized such that the valve body 501 may be ensured to contact the mechanical stops in either position A or B.

One skilled in the art will appreciate that there may be varied methods of applying an external force to the movable connector 500, resulting from placing device 504 to position A or position B, or removal of device 504 from position A or position B. Magnets may be used in 504 to pull or push 501 into the desired position A or position B.

In some embodiments, linkages or travel paths 542 may be incorporated into first device 102 (502) to provide movement of the movable connector 500 in alternate directions or to rotate. In some embodiments, the travel paths may take a non-linear shape (e.g., indicated by 544) in order to enable desired alignment of the first or second connecting elements 514, 516 with respective branches 522, 526 and/or elongated portion 520, to reduce or minimize signal loss. For example, the non-linear travel path 544 of the movable connector 500 movement may be configured such that an initial motion 546 may increase a gap between mating faces of a respective connecting element (e.g., 516) with the corresponding branch 526 or elongated portion 520, a secondary motion 548 may cause the alignment of the mating faces to begin, and a final motion 550 may bring the face of the connecting element (e.g., 516) in contact with the mating face of the corresponding connecting element.

In addition or in the alternative to modification of the travel path of the movable connector 500, the faces of the connecting elements (e.g., 514, 516) and corresponding mating faces of the waveguide elements (e.g., elongated portion 520 and branches 522, 526), as well as corresponding surfaces of body 501 may be tapered, as indicated by example surfaces 552, 554, 556. One skilled in the art will appreciate that the surfaces 552, 554, 556 are shown for illustration only. As indicated above, the body of the movable connector and components comprising the waveguide (e.g., 520, 522, 526) may also be tampered to match the faces of the connecting elements 514, 516. Tapering of the mating faces, in combination with the modification path described above (or in the alternative) may provide a desired alignment of the connecting elements of the movable connector with corresponding waveguide components, to ensure reduced signal loss, FIGS. 6-8 illustrate example schematic diagrams of a movable connector that may be used with system 100 (200) described in reference to FIGS. 1-5, in accordance with some embodiments.

Figure 6:
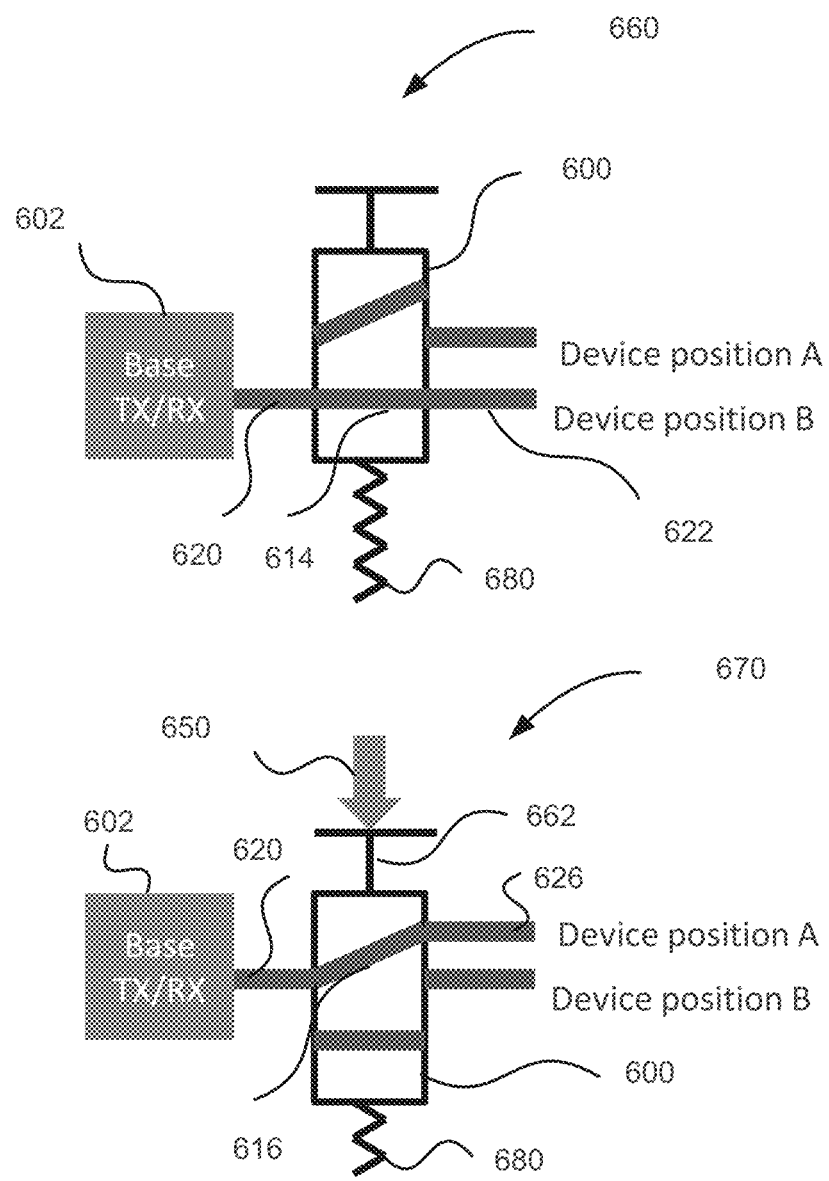
FIGS. 6-8 illustrate example schematic diagrams of a movable connector that may be used with a system described in reference to FIGS. 1-5, in accordance with some embodiments.

FIG. 6 illustrates a translating embodiment of a movable connector 600 in positions 660 and 670 that correspond to positions B and A of a mountable device respectively, as described in reference to FIG. 1. If a mountable device (not shown) is in position B, the movable connector 600 may remain in an initial position ensured by an actuator (e.g., spring) 680. The communicative connection between device 602 (e.g., base) with the mountable device may be provided by a waveguide formed by an elongated portion 620, coupled with a first connecting element 614 of the movable connector 600, which also may be coupled with a first branch 622.

If a mountable device is placed in position A, the actuator (e.g., spring) 680 may depress as a result of application of external force 650. The external force 650 may be inflicted, for example, by direct or indirect pressure applied by the mountable device to an intermediary 662 coupled with the movable connector 600. Accordingly, the movable connector 600 may move down from its initial position, thus aligning a second connecting element 616 with elongated portion 620 and a second branch 626, and providing communicative connection between device 602 and the mountable device.

Figure 7:
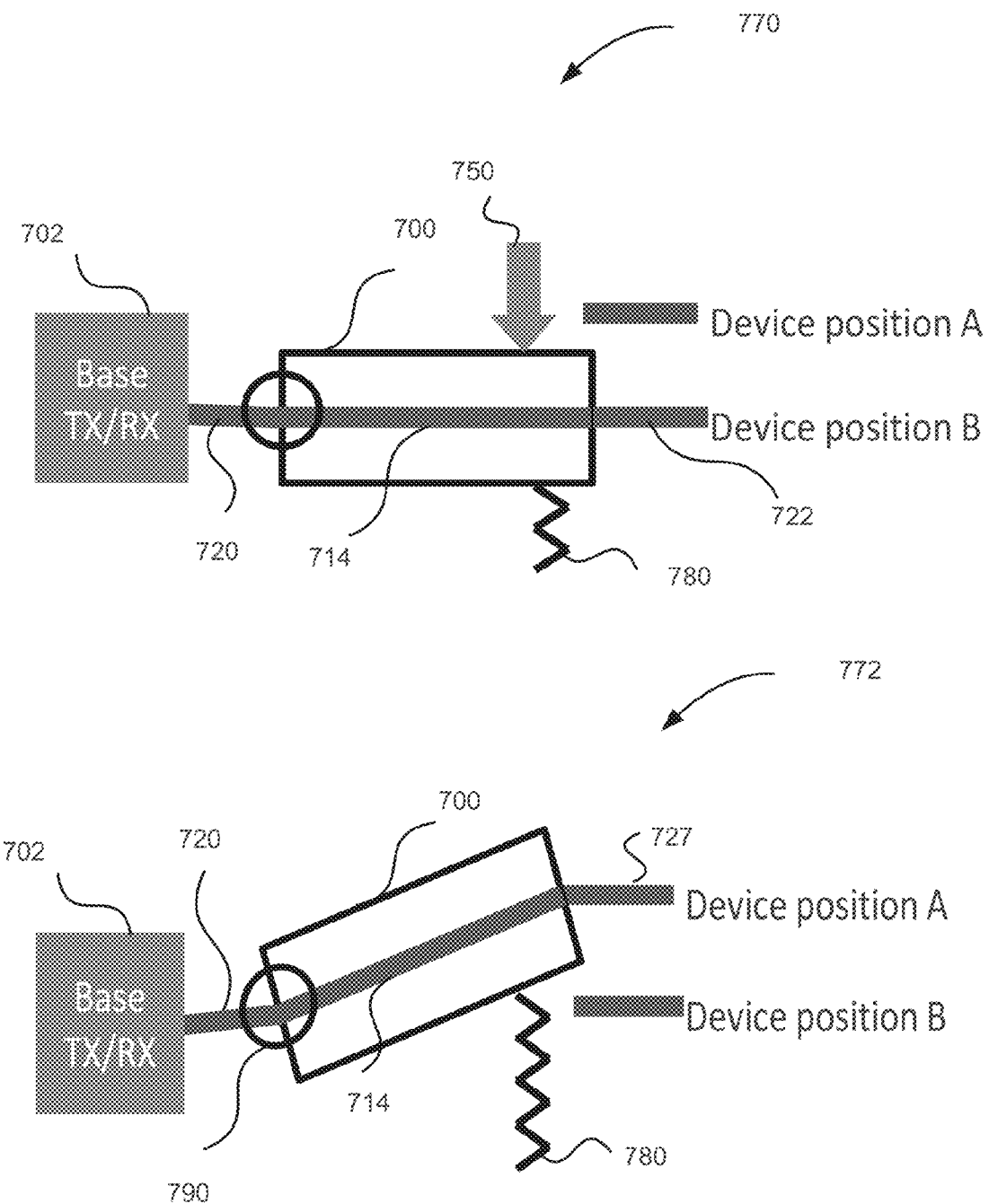
Figure 8:
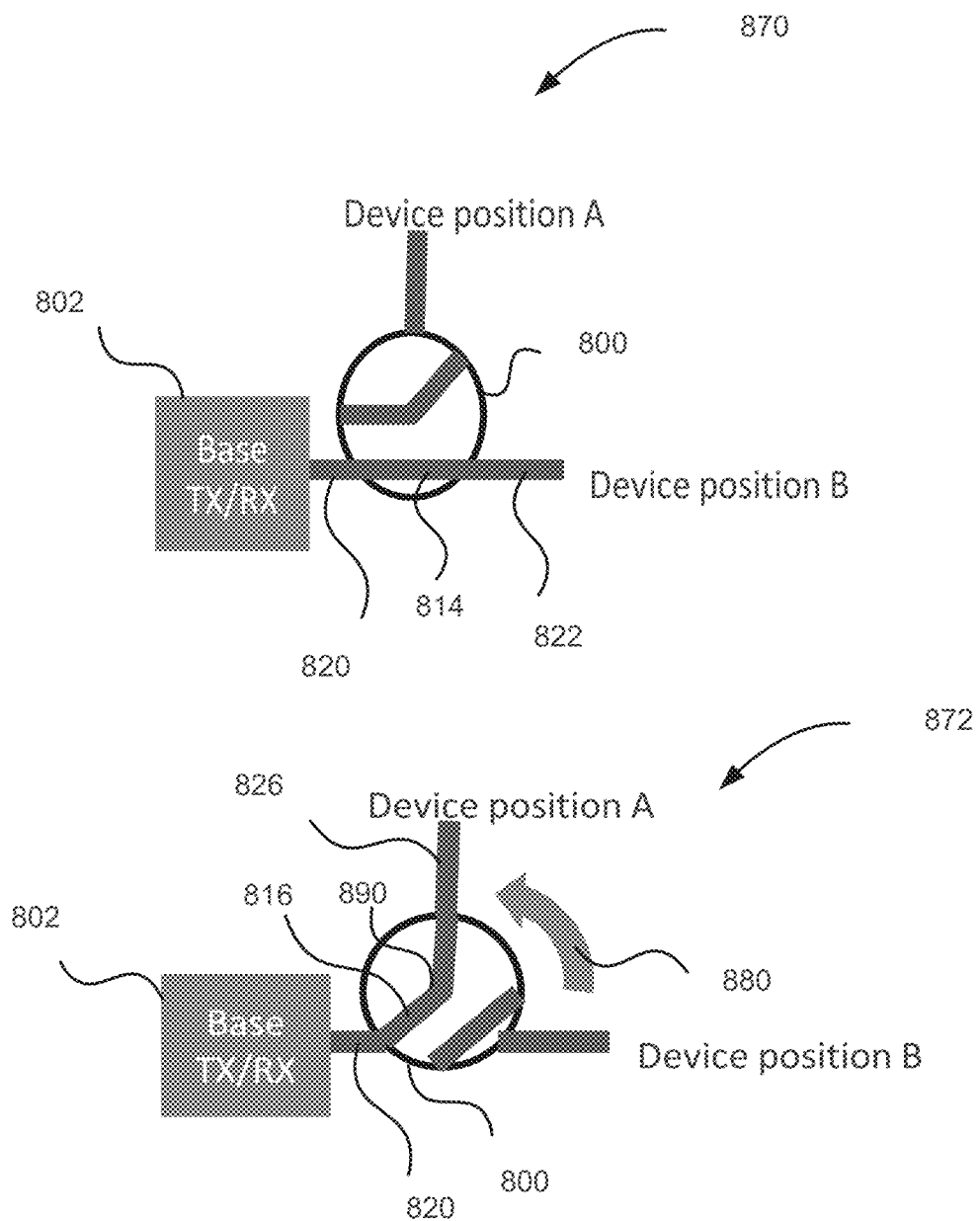

FIG. 7 illustrates a rotating embodiment of a movable connector 700 in positions 770 and 772 that correspond to positions B and A of a mountable device respectively, as described in reference to FIG. 1. If a mountable device (not shown) is in position B, an actuator (e.g., spring) 780 coupled with the movable connector 700 may depress as a result of application of external force 750 to the movable connector 700. The external force 750 may be inflicted, for example, by direct or indirect pressure applied by the mountable device to the movable connector 700 as described above. The communicative connection between device 702 (e.g., base) with the mountable device may be provided by a waveguide formed by an elongated portion 720, coupled with a connecting element 714 of the movable connector 700, which also may be coupled with a first branch 722.

If a mountable device is placed in position A, the movable connector 700 may return to its initial position defined by the actuator (e.g., spring) 780. As shown, the movable connector 700 may partially rotate around an axis 790, as a result of flexing the actuator 780. As a result of the partial rotation, the movable connector 700 may enable alignment of the connecting element 714 with elongated portion 720 and a second branch 727, and provide communicative connection between device 702 and the mountable device.

FIG. 8 illustrates a rotating embodiment of a movable connector 800 in positions 870 and 872 that correspond to positions B and A of a mountable device respectively, as described in reference to FIG. 1. If a mountable device (not shown) is placed in position B, the movable connector 800 may remain in its initial position. In this position, the communicative connection between device 802 (e.g., base) with the mountable device may be provided by a waveguide formed by an elongated portion 820, coupled with a first connecting element 814 of the movable connector 800, which also may be coupled with a first branch 822.

If a mountable device is placed in position A, the movable connector 800 may partially rotate in a direction indicated by arrow 880, e.g., around its axis 890. As discussed above, the movable device 800 rotation may be caused by a placement of the mountable device (not shown) into position A or removal of the mountable device from position B. As a result of the partial rotation, the movable connector 800 may enable alignment of a second connecting element 816 of the movable connector 800 with elongated portion 820 and a second branch 826, thus forming a waveguide and providing communicative connection between device 702 and the mountable device.

Figure 9:
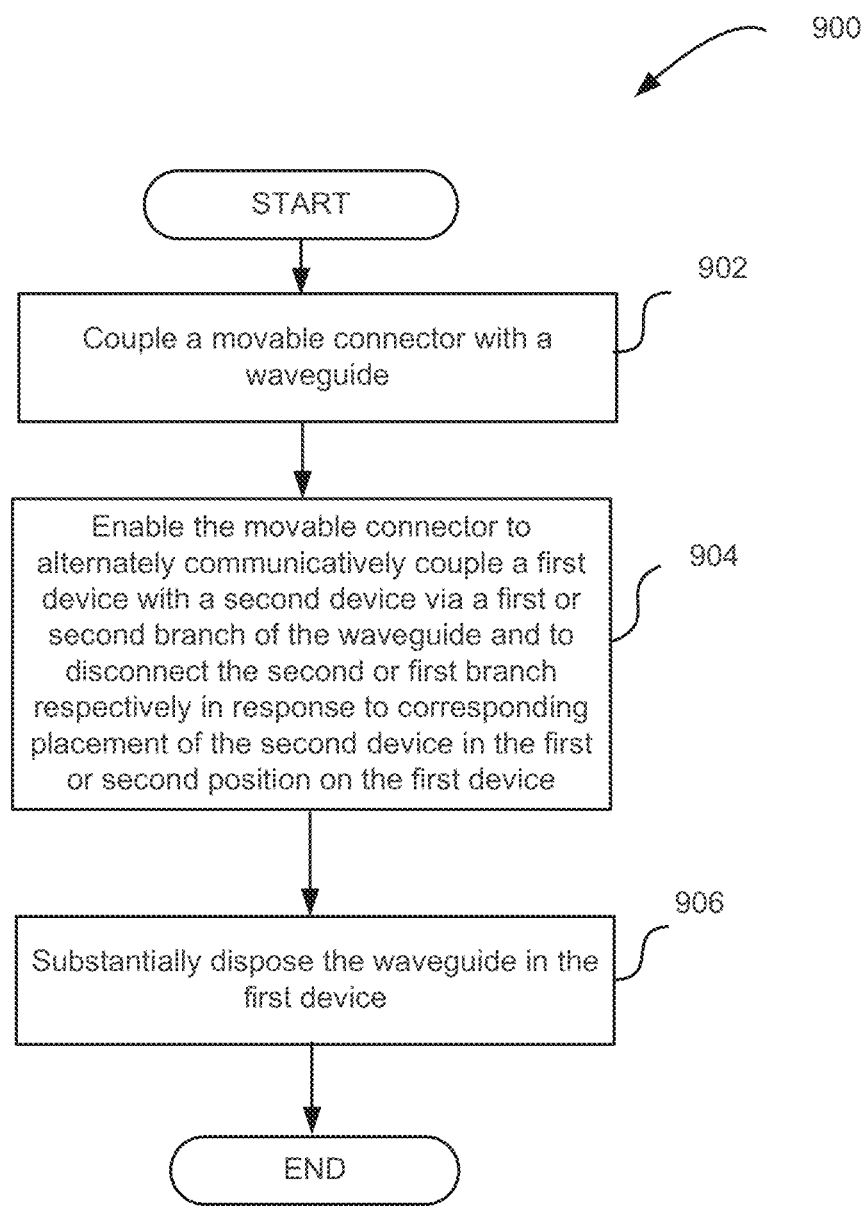
FIG. 9 schematically illustrates a process flow diagram for providing a waveguide with a movable connector configured to alternatively couple first and second devices as described herein, in accordance with some embodiments.

FIG. 9 schematically illustrates a process flow diagram for providing a waveguide with a movable connector configured to alternatively couple first and second devices as described herein, in accordance with some embodiments.

At block 902, a movable connector may be coupled with a waveguide. The waveguide may comprise first and second branches and an elongated portion, as described in reference to FIGS. 1-8. In some embodiments, the movable connector may be coupled at an end of the elongated portion, providing alternate connection with the first or second branch.

At block 904, the movable connector may be enabled to alternately and communicatively couple a first device with a second device via the first or second branch of the waveguide and to disconnect the second or first branch respectively in response to corresponding placement of the second device in the first or second position on the first device. Enabling may include enabling the movable connector to move into a third position to communicatively couple the first device with the second device via the first branch and to disconnect the second branch, in response to placement of the second device in the first position.

Enabling may further include enabling the movable connector to move into a fourth position to communicatively couple the first device with the second device via the second branch and to disconnect the first branch, in response to placement of the second device in the second position.

Enabling may further include causing the movable connector to return into one of the third or fourth positions, in response to placement of the second device in the first or second position respectively or in response to removal of the second device from the first device.

At block 906, the waveguide provided as described in the above operations may be substantially disposed in the first device. Disposing may include connecting a first communication component of the first device with another end of the elongated portion of the waveguide.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 10:
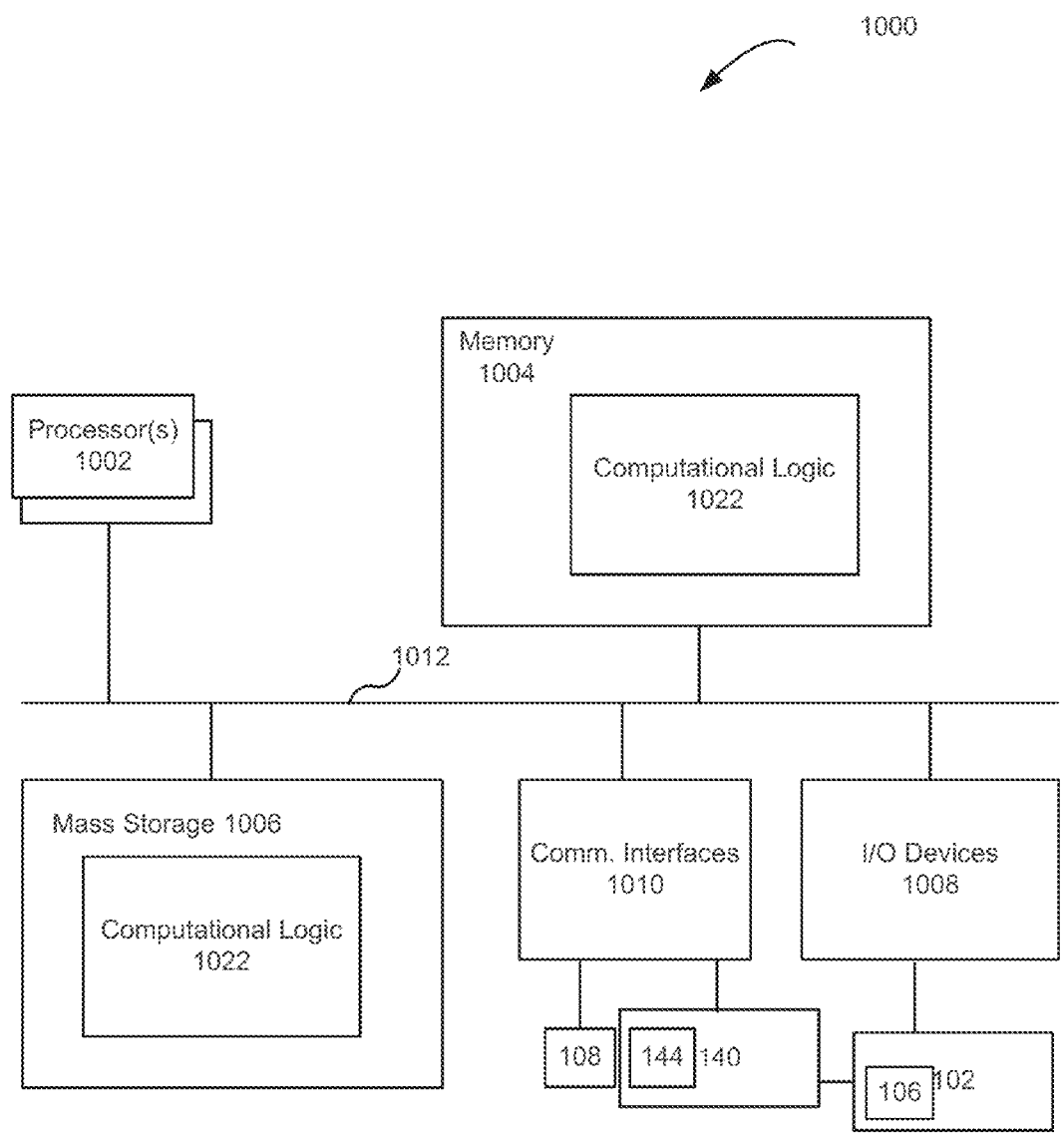
FIG. 10 schematically illustrates an example computing device including at least some of the components described in reference to FIGS. 1-8, in accordance with some embodiments.

FIG. 10 illustrates an example computing device 1000 suitable for use with various components of system 100 of FIG. 1. For example, the computing device may include some or all of the components of the second device 104, such as a tablet computing device or any other computing device, and/or first device 102, such as a peripheral device, including waveguide 140 with movable connector 144, in accordance with various embodiments.

As shown, computing device 1000 may include one or more processors or processor cores 1002 and system memory 1004. For the purpose of this application, including the claims, the terms "processor" and "processor cores" may be considered synonymous, unless the context clearly requires otherwise. The processor 1002 may include any type of processors, such as a central processing unit (CPU), a microprocessor, and the like. The processor 1002 may be implemented as an integrated circuit having multi-cores, e.g., a multi-core microprocessor. The computing device 1000 may include mass storage devices 1006 (such as diskette, hard drive, volatile memory (e.g., dynamic random-access memory (DRAM), compact disc read-only memory (CD-ROM), digital versatile disk (DVD), and so forth)). In general, system memory 1004 and/or mass storage devices 1006 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1000 may further include input/output (I/O) devices 1008 (such as a display (e.g., a touchscreen display), keyboard, cursor control, remote control, gaming controller, image capture device, and so forth) and communication interfaces 1010 (such as network interface cards, optical apparatuses, modems, infrared receivers, radio receivers (e.g., Bluetooth), and so forth). In some embodiments, the I/O devices 1008 may include a peripheral device (e.g., keyboard) such as first device 102 described in reference to FIG. 1. As described in reference to FIG. 1, first device 102 may include, among other components, first communication component (e.g., transceiver) 106.

In some embodiments, the communication interfaces 1010 may include some components of the devices 102 and 104 referenced in FIG. 1, such as waveguide 140 and second communication component (e.g., transceiver) 108. The waveguide 140 may include a movable connector 144 implementing aspects of the embodiments described above.

The communication interfaces 1010 may include communication chips (not shown) that may be configured to operate the device 1000 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1010 may operate in accordance with other wireless protocols in other embodiments.

The above-described computing device 1000 elements may be coupled to each other via system bus 1012, which may represent one or more buses. In the case of multiple buses, they may be bridged by one or more bus bridges (not shown). Each of these elements may perform its conventional functions known in the art. In particular, system memory 1004 and mass storage devices 1006 may be employed to store a working copy and a permanent copy of the programming instructions for the operation of the system 100 of FIG. 1. The various elements may be implemented by assembler instructions supported by processor(s) 1002 or high-level languages that may be compiled into such instructions.

The permanent copy of the programming instructions may be placed into permanent storage devices 1006 in the factory, or in the field through, for example, a distribution medium (not shown), such as a compact disc (CD), or through communication interface 1010 (from a distribution server (not shown)). That is, one or more distribution media having an implementation of the agent program may be employed to distribute the agent and to program various computing devices.

The number, capability, and/or capacity of the elements 1008, 1010, 1012 may vary, depending on whether computing device 1000 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1004 may include computational logic 1022 configured to practice aspects of embodiments pertaining to system 100 of FIG. 1 and embodiments of FIGS. 2-8. For one embodiment, at least one of processors

1002 may be packaged together with computational logic 1022 configured to practice aspects of communication between devices 102 and 104 via waveguide 140 described herein to form a System in Package (SiP) or a System on Chip (SoC).

In various implementations, the computing device 1000 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1000 may be any other electronic device that processes data.

Example 1 is an apparatus for alternate coupling a first device with a second device, the apparatus comprising a first device, a second device mountable on the first device in a first or second position, and a waveguide substantially disposed in the first device to communicatively couple the first device with the second device, wherein the waveguide comprises a movable connector and at least first and second branches corresponding to the first and second positions, wherein the movable connector is to alternately communicatively couple the first device with the second device via the first or second branch and disconnect the second or first branch respectively in response to corresponding placement of the second device in the first or second position.

Example 2 may include the subject matter of Example 1, and further specifies that the movable connector is movable into a third position to communicatively couple the first device with the second device via the first branch and to disconnect the second branch, in response to placement of the second device in the first position; and wherein the movable connector is movable into a fourth position to communicatively couple the first device with the second device via the second branch and to disconnect the first branch, in response to placement of the second device in the second position.

Example 3 may include the subject matter of Example 2, and further specifies that the movable connector is to return into one of the third or fourth positions, in response to removal of the second device from the first device.

Example 4 may include the subject matter of Example 2, and further specifies that the movable connector is at least partially rotatable, movable laterally, or movable in a substantially vertical direction or under an angle relative to the first device, to move the movable connector into the third or fourth position.

Example 5 may include the subject matter of Example 2, and further specifies that the apparatus may further comprise a return component to return the movable connector into one of the third or fourth positions, in response to placement of the second device in the first or second position respectively or in response to removal of the second device from the first device.

Example 6 may include the subject matter of Example 5, and further specifies that the return component comprises one of a spring or an electromagnetic actuator.

Example 7 may include the subject matter of Example 1, and further specifies that the first device comprises a first communication component and the second device comprises a second communication component, wherein to communicatively couple the first device with the second device includes to communicatively couple the first and second communication components.

Example 8 may include the subject matter of Example 7, and further specifies that the first and second communication components comprise transceivers to transmit and receive radio frequency signals.

Example 9 may include the subject matter of Example 7, and further specifies that the waveguide further comprises an elongated portion, wherein a first end of the elongated portion is connected with the first communication component, wherein the movable connector comprises a valve disposed at a second end of the elongated portion to alternately connect the second communication component with the first communication component via the first or second branch.

Example 10 may include the subject matter of Example 9, and further specifies that the valve includes at least one connecting element that is alignable with the first or second branch.

Example 11 may include the subject matter of Example 1, and further specifies that the second device comprises a computing device, and wherein the first device comprises a peripheral device connectable with the computing device via the waveguide.

Example 12 may include the subject matter of Example 11, and further specifies that the computing device comprises a tablet computer, wherein the first device comprises a keyboard, and wherein one of the first or second positions corresponds to an open clamshell orientation of the tablet computer relative to the keyboard, and wherein another of the first or second positions corresponds to a closed orientation of the tablet computer relative to the keyboard.

Example 13 may include the subject matter of Example 1 to 12, and further specifies that the waveguide comprises at least one of: a dielectric clad in a signal-containing material, an air-filled tube, or an optical fiber cable.

Example 14 is an apparatus for alternate coupling a first device with a second device, the apparatus comprising a waveguide substantially disposable in a first device, wherein the waveguide includes: an elongated portion; a movable connector movably coupled with the elongated portion; and at least first and second branches, wherein the movable connector is to alternately couple the first device with a second device that is removably mountable on the first device in a first or second position, wherein to alternately couple includes to connect the first and second devices via the first or second branch and disconnect the second or first branch respectively in response to corresponding placement of the second device in the first or second position.

Example 15 may include the subject matter of Example 14, and further specifies that a first end of the elongated portion is connected with a first communication component of the first device, wherein the movable connector comprises a valve disposed at a second end of the elongated portion, to alternately connect a second communication component of the second device with the first communication component via the first or second branch.

Example 16 may include the subject matter of Example 14, and further specifies that the valve includes at least one connecting element that is alignable with the first or second branch or that forms the first or second branch in response to corresponding placement of the second device in the first or second position.

Example 17 may include the subject matter of Example 14 to 16, and further specifies that the first device comprises a peripheral device and wherein the second device comprises a computing device connectable with the peripheral device via the waveguide.

Example 18 is a method for providing a movable connector, comprising: coupling a movable connector with a waveguide; and enabling the movable connector to alternately and communicatively couple a first device with a second device via a first or second branch of the waveguide and to disconnect the second or first branch respectively in response to corresponding placement of the second device in a first or second position on the first device.

Example 19 may include the subject matter of Example 18, and further specifies that the method may further comprise substantially disposing the waveguide in the first device, the disposing including connecting a first communication component of the first device with a first end of an elongated portion of the waveguide, wherein coupling the movable connector with the waveguide includes connecting the movable connector to a second end of the elongated portion of the waveguide.

Example 20 may include the subject matter of Example 18, and further specifies that enabling the movable connector to alternately and communicatively couple a first device with a second device includes: enabling the movable connector to move into a third position to communicatively couple the first device with the second device via the first branch and to disconnect the second branch, in response to placement of the second device in the first position; and enabling the movable connector to move into a fourth position to communicatively couple the first device with the second device via the second branch and to disconnect the first branch, in response to placement of the second device in the second position.

Example 21 may include the subject matter of Example 20, and further specifies that enabling the movable connector to alternately and communicatively couple a first device with a second device further includes causing the movable connector to return into one of the third or fourth positions, in response to placement of the second device in the first or second position respectively or in response to removal of the second device from the first device.

Example 22 may include the subject matter of Example 18 to 21, and further specifies that the first device comprises a peripheral device, and the second device comprises a computing device mountable on the peripheral device in the first or second position.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus comprising:
a first device;
a second device mountable on the first device in a first or second position; and
a waveguide substantially disposed in the first device to communicatively couple the first device with the second device, wherein the waveguide comprises a movable connector and at least first and second branches corresponding to the first and second positions, wherein the movable connector is to alternately communicatively couple the first device with the second device via the first or second branch and disconnect the second or first branch respectively in response to corresponding placement of the second device in the first or second position,
wherein the movable connector is movable into a third position to communicatively couple the first device with the second device via the first branch and to disconnect the second branch, in response to placement of the second device in the first position; and wherein the movable connector is movable into a fourth position to communicatively couple the first device with the second device via the second branch and to disconnect the first branch, in response to placement of the second device in the second position.

2. The apparatus of claim 1, wherein the movable connector is to return into one of the third or fourth positions, in response to removal of the second device from the first device.

3. The apparatus of claim 1, wherein the movable connector is at least partially rotatable, movable laterally, or movable in a substantially vertical direction or under an angle relative to the first device, to move the movable connector into the third or fourth position.

4. The apparatus of claim 1, further comprising a return component to return the movable connector into one of the third or fourth positions, in response to placement of the second device in the first or second position respectively or in response to removal of the second device from the first device.

5. The apparatus of claim 4, wherein the return component comprises one of a spring or an electromagnetic actuator.

6. The apparatus of claim 1, wherein the first device comprises a first communication component and the second device comprises a second communication component, wherein to communicatively couple the first device with the second device includes to communicatively couple the first and second communication components.

7. The apparatus of claim 6, wherein the first and second communication components comprise transceivers to transmit and receive radio frequency signals.

8. The apparatus of claim 6, wherein the waveguide further comprises an elongated portion, wherein a first end of the elongated portion is connected with the first communication component, wherein the movable connector comprises a valve disposed at a second end of the elongated portion to alternately connect the second communication component with the first communication component via the first or second branch.

9. The apparatus of claim 8, wherein the valve includes at least one connecting element that is alignable with the first or second branch.

10. The apparatus of claim 1, wherein the second device comprises a computing device, and wherein the first device comprises a peripheral device connectable with the computing device via the waveguide.

11. The apparatus of claim 10, wherein the computing device comprises a tablet computer, wherein the first device comprises a keyboard, and wherein one of the first or second positions corresponds to an open clamshell orientation of the tablet computer relative to the keyboard, and wherein another of the first or second positions corresponds to a closed orientation of the tablet computer relative to the keyboard.

12. The apparatus of claim 1, wherein the waveguide comprises at least one of: a dielectric clad in a signal-containing material, an air-filled tube, or an optical fiber cable.

13. A method, comprising:
coupling a movable connector with a waveguide; and
enabling the movable connector to alternately and communicatively couple a first device with a second device via a first or second branch of the waveguide and to disconnect the second or first branch respectively in response to corresponding placement of the second device in a first or second position on the first device,
wherein the first device comprises a peripheral device, and wherein the second device comprises a computing device mountable on the peripheral device in the first or second position.

14. The method of claim 13, further comprising:
substantially disposing the waveguide in the first device, the disposing including connecting a first communication component of the first device with a first end of an elongated portion of the waveguide, wherein coupling the movable connector with the waveguide includes connecting the movable connector to a second end of the elongated portion of the waveguide.

15. The method of claim 13, wherein enabling the movable connector to alternately and communicatively couple a first device with a second device includes:
enabling the movable connector to move into a third position to communicatively couple the first device with the second device via the first branch and to disconnect the second branch, in response to placement of the second device in the first position; and
enabling the movable connector to move into a fourth position to communicatively couple the first device with the second device via the second branch and to disconnect the first branch, in response to placement of the second device in the second position.

16. The method of claim 15, wherein enabling the movable connector to alternately and communicatively couple a first device with a second device further includes:
causing the movable connector to return into one of the third or fourth positions, in response to placement of the second device in the first or second position respectively or in response to removal of the second device from the first device.

* * * * *